US008449387B2

(12) United States Patent
Englman et al.

(10) Patent No.: US 8,449,387 B2
(45) Date of Patent: May 28, 2013

(54) PROGRESSIVE GAME ELIGIBILITY AND WINNING

(75) Inventors: Allon G Englman, Chicago, IL (US); Joel R. Jaffe, Glenview, IL (US); Shridhar P. Joshi, Naperville, IL (US); Michael W. Mastropietro, Chicago, IL (US); Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 606 days.

(21) Appl. No.: 12/307,106

(22) PCT Filed: Jun. 29, 2007

(86) PCT No.: PCT/US2007/015206
§ 371 (c)(1),
(2), (4) Date: Jun. 30, 2009

(87) PCT Pub. No.: WO2008/010904
PCT Pub. Date: Jan. 24, 2008

(65) Prior Publication Data

US 2009/0270168 A1 Oct. 29, 2009

Related U.S. Application Data

(60) Provisional application No. 60/817,955, filed on Jun. 30, 2006.

(51) Int. Cl.
*A63F 13/00* (2006.01)

(52) U.S. Cl.
USPC .................................. 463/27; 463/26; 463/42

(58) Field of Classification Search
USPC ................................................ 463/27, 26, 42
See application file for complete search history.

(56) References Cited

U.S. PATENT DOCUMENTS

| | | | | |
|---|---|---|---|---|
| 5,580,309 | A | 12/1996 | Piechowiak et al. | 463/16 |
| 5,655,961 | A | 8/1997 | Acres et al. | 463/27 |
| 5,702,304 | A | 12/1997 | Acres et al. | 463/29 |
| 5,741,183 | A | 4/1998 | Acres et al. | 463/42 |
| 5,820,459 | A | 10/1998 | Acres et al. | 463/25 |
| 5,876,284 | A | 3/1999 | Acres et al. | 463/25 |
| 5,911,626 | A | 6/1999 | McCrea, Jr. | 463/27 |
| 6,012,982 | A | 1/2000 | Piechowiak et al. | 463/16 |

(Continued)

FOREIGN PATENT DOCUMENTS

| | | | |
|---|---|---|---|
| WO | WO 2005032675 | A2 | 4/2005 |
| WO | WO 2005099425 | A2 | 10/2005 |

(Continued)

OTHER PUBLICATIONS

PCT International Search Report for International Application No. PCT/US2007/015206 dated Sep. 19, 2008 (2 pages).

(Continued)

*Primary Examiner* — Damon Pierce
(74) *Attorney, Agent, or Firm* — Nixon Peabody LLP

(57) ABSTRACT

A gaming system for conducting a wagering game includes both enhanced as well as new ways of winning a progressive jackpot. New ways of becoming eligible for a progressive jackpot are also disclosed. In some embodiments, the reset amount, startup value, and funding percentage may be selected as needed to improve player excitement and anticipation. Players may also customize various aspects of the progressive game upon payment of a fee.

24 Claims, 11 Drawing Sheets

U.S. PATENT DOCUMENTS

| | | | | |
|---|---|---|---|---|
| 6,162,122 | A | 12/2000 | Acres et al. | 463/29 |
| 6,254,483 | B1 | 7/2001 | Acres | 463/26 |
| 6,257,981 | B1 | 7/2001 | Acres et al. | 463/26 |
| 6,312,333 | B1 | 11/2001 | Acres | 463/25 |
| 6,364,314 | B1 | 4/2002 | Canterbury | 273/274 |
| 6,364,768 | B1 | 4/2002 | Acres et al. | 463/25 |
| 6,371,852 | B1 | 4/2002 | Acres | 463/25 |
| 6,375,567 | B1 | 4/2002 | Acres | 463/25 |
| 6,375,569 | B1 | 4/2002 | Acres | 463/27 |
| 6,416,409 | B1 * | 7/2002 | Jordan | 463/27 |
| 6,431,983 | B2 | 8/2002 | Acres | 463/25 |
| RE37,885 | E | 10/2002 | Acres et al. | 463/42 |
| 6,565,434 | B1 | 5/2003 | Acres | 463/25 |
| 6,575,832 | B1 | 6/2003 | Manfredi et al. | 463/25 |
| 6,607,441 | B1 | 8/2003 | Acres | 463/25 |
| 6,712,697 | B2 | 3/2004 | Acres | 463/25 |
| 6,800,030 | B2 | 10/2004 | Acres | 463/25 |
| 6,832,958 | B2 | 12/2004 | Acres et al. | 463/25 |
| 6,878,063 | B2 | 4/2005 | Manfredi et al. | 463/25 |
| 6,910,964 | B2 | 6/2005 | Acres | 463/25 |
| RE38,812 | E | 10/2005 | Acres et al. | 463/26 |
| 7,037,195 | B2 | 5/2006 | Schneider et al. | 463/25 |
| 7,048,628 | B2 | 5/2006 | Schneider | 463/16 |
| 2003/0036425 | A1 | 2/2003 | Kaminkow et al. | 463/25 |
| 2004/0048644 | A1 * | 3/2004 | Gerrard et al. | 463/16 |
| 2004/0242320 | A1 * | 12/2004 | Jackson | 463/26 |
| 2005/0003880 | A1 | 1/2005 | Englman et al. | 463/16 |
| 2005/0003886 | A1 | 1/2005 | Englman et al. | 463/25 |
| 2005/0059481 | A1 * | 3/2005 | Joshi et al. | 463/27 |
| 2005/0176494 | A1 * | 8/2005 | Thomas | 463/25 |
| 2006/0003829 | A1 | 1/2006 | Thomas | 463/20 |
| 2006/0009283 | A1 | 1/2006 | Englman et al. | 463/25 |
| 2006/0073897 | A1 | 4/2006 | Englman et al. | 463/42 |
| 2006/0100019 | A1 | 5/2006 | Hornik et al. | 463/42 |
| 2006/0135243 | A1 | 6/2006 | Englman et al. | 463/16 |
| 2006/0287043 | A1 | 12/2006 | Englman et al. | 463/16 |
| 2007/0060319 | A1 | 3/2007 | Block et al. | 463/27 |
| 2008/0070679 | A1 | 3/2008 | Seelig et al. | 463/26 |
| 2008/0261683 | A1 | 10/2008 | Russell et al. | 463/26 |
| 2011/0003636 | A1 * | 1/2011 | Thomas et al. | 463/27 |

FOREIGN PATENT DOCUMENTS

| | | | |
|---|---|---|---|
| WO | WO 2005099845 | A1 | 10/2005 |
| WO | WO 2005110563 | A2 | 11/2005 |
| WO | WO 2005113093 | A1 | 12/2005 |
| WO | WO 2006014770 | A2 | 2/2006 |
| WO | WO 2006014990 | A2 | 2/2006 |
| WO | WO 2006039349 | A2 | 4/2006 |
| WO | WO 2006044252 | A2 | 4/2006 |
| WO | WO 2006130597 | A2 | 12/2006 |
| WO | WO 2006130611 | A2 | 12/2006 |
| WO | WO 2007028108 | A2 | 3/2007 |
| WO | WO 2007030552 | A2 | 3/2007 |
| WO | WO 2007030632 | A2 | 3/2007 |
| WO | WO 2007030733 | A2 | 3/2007 |
| WO | WO 2007032945 | A2 | 3/2007 |
| WO | WO 2007130464 | A2 | 11/2007 |
| WO | WO 2008060978 | A2 | 5/2008 |

OTHER PUBLICATIONS

PCT Written Opinion for International Application No. PCT/US2007/015206 dated Sep. 19, 2008 (3 pages).

* cited by examiner

PROGRESSIVE GAME ELIGIBILITY AND WINNING

CROSS REFERENCE TO RELATED APPLICATIONS

This application is a U.S. national stage of International Application No. PCT/US2007/015206, filed Jun. 29, 2007, which is related to and claims priority to U.S. Provisional Application No. 60/817,955, filed Jun. 30, 2006, each of which is incorporated herein its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to methods of becoming eligible for and winning progressive game jackpots.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "base" game. The bonus game may comprise any type of game, either similar to or completely different from the base game, which is entered upon the occurrence of a selected event or outcome in the base game. Generally, bonus games provide a greater expectation of winning than the base game and may also be accompanied by more attractive or unusual video displays and/or audio.

Another concept that has been employed is the use of a progressive jackpot. In the gaming industry, a "progressive" involves collecting coin-in data from participating gaming machines (e.g., slot machines), contributing a percentage of the coin-in to a jackpot amount, and awarding that jackpot amount to a player upon the occurrence of a certain jackpot-won event. The percentage of the coin-in is typically determined prior to any result being achieved and is independent of any result. A jackpot-won event typically occurs when a "progressive winning position" is achieved at a participating gaming machine. If the gaming machine is a slot machine, a progressive winning position may, for example, correspond to alignment of progressive jackpot reel symbols along a certain payline. The initial progressive jackpot is a predetermined minimum startup amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, leading to even greater player excitement.

Because the progressive concept offers tremendous advantages in player appeal and excitement relative to other known games, and because such progressives are attractive to both players and operators, there is a continuing need to develop gaming machines with new types of progressives having enhanced features to satisfy the demands of players and operators.

SUMMARY OF THE INVENTION

According to one aspect of the present invention, a gaming machine for conducting a wagering game comprises a wager input device for receiving a wager input from a player for playing a wagering game, and at least one display operable to display an outcome of the wagering game. The outcome is randomly selected from a plurality of outcomes, the plurality of outcomes including at least one progressive resetting outcome for a progressive jackpot associated with the wagering game. In response to the randomly-selected outcome being the at least one progressive resetting outcome, the progressive jackpot is reset to an initial amount, the initial amount being different from an immediately previous initial amount.

According to another aspect of the present invention, a gaming machine comprises a wager input device for receiving a wager input from a player for playing a wagering game, and at least one display operable to display an outcome of the wagering game. The outcome is randomly selected from a plurality of outcomes, the plurality of outcomes including at least one progressive winning outcome for a progressive jackpot associated with the wagering game. The at least one the display is operable to display the progressive jackpot, including a progress of the progressive jackpot and an expected value marker, in a non-numerical manner.

According to yet another aspect of the present invention, a gaming machine comprises a wager input device for receiving a wager input from a player for playing a wagering game, and at least one display operable to display an outcome of the wagering game. The outcome is randomly selected from a plurality of outcomes, the plurality of outcomes including at least one progressive changing outcome for a progressive jackpot associated with the wagering game. in response to the randomly-selected outcome being the at least one progressive changing outcome, the progressive jackpot changing from a first type of progressive jackpot to second type of progressive jackpot.

According to still another aspect of the present invention, a gaming machine comprises a wager input device for receiving a wager input from a player for playing a wagering game, and at least one display operable to display an outcome of the wagering game. The outcome being randomly selected from a plurality of outcomes, the plurality of outcomes including at least one near-match outcome for a progressive event associated with the wagering game. In response to the randomly-selected outcome being the at least one near-match outcome, the player being awarded a portion of a total award available from the progressive event.

According to yet another aspect of the present invention, a gaming machine comprises a wager input device for receiving a wager input from a player for playing a wagering game, and at least one display operable to display an outcome of the wagering game. The outcome is randomly selected from a plurality of outcomes, the plurality of outcomes including at least one progressive-eligibility outcome for a progressive jackpot associated with the wagering game. In response to the randomly-selected outcome being the at least one progressive-eligibility outcome, the player becoming eligible for the progressive jackpot.

According to still another aspect of the present invention, a gaming machine comprises a wager input device for receiving a wager input from a player for playing a wagering game, and at least one display operable to display an outcome of the wagering game and a standard pay table therefor. The outcome is randomly selected from a plurality of outcomes, the plurality of outcomes including at least one progressive-eligibility outcome for a progressive jackpot associated with the wagering game. In response to the randomly-selected outcome being the at least one progressive-eligibility outcome, the at least one display displaying a progressive pay table for the progressive jackpot.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
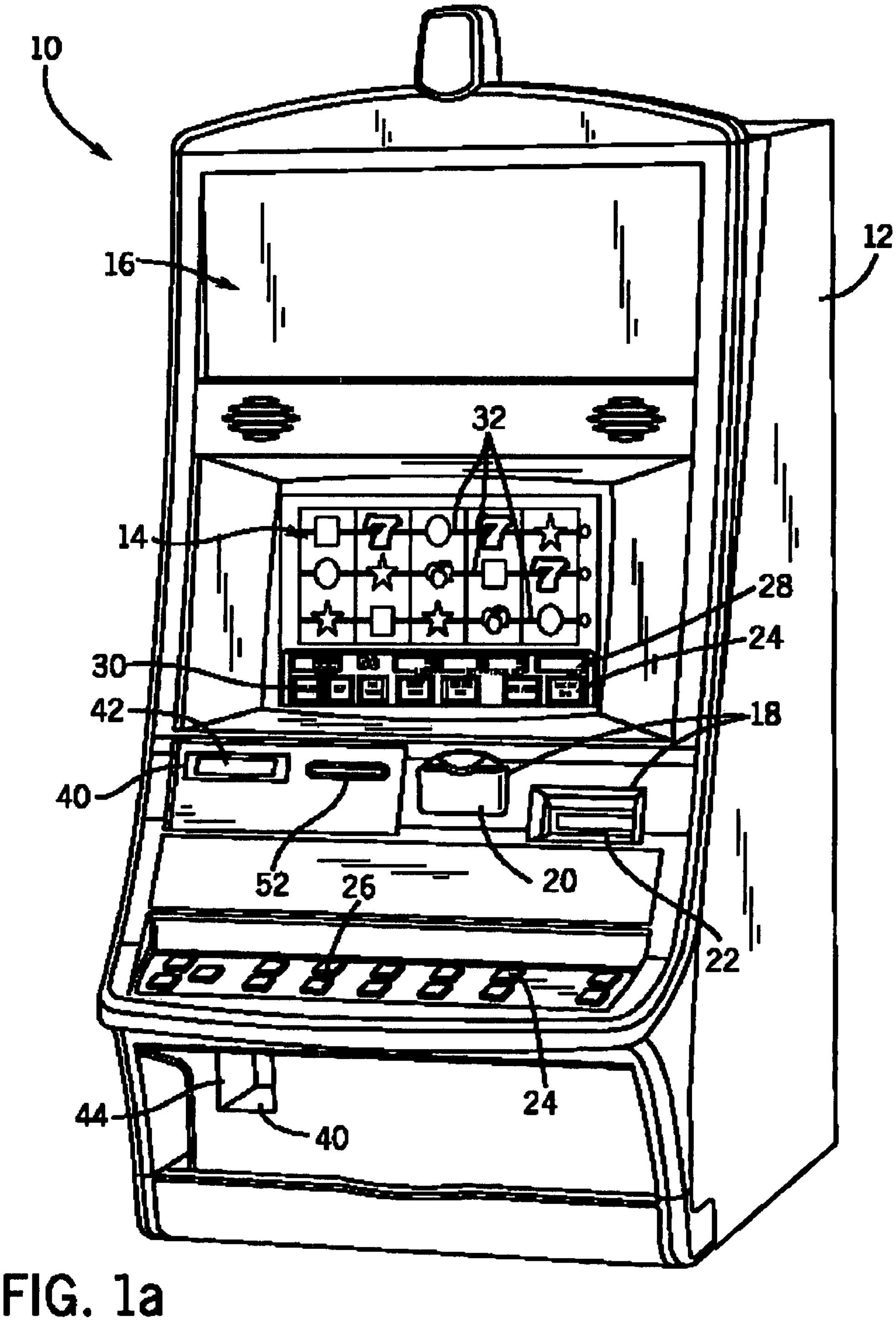
FIG. 1A is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1A, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the base wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1A). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1A, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the base wagering game is displayed to the player on the primary display 14. The primary display 14 can also display the bonus game associated with the base wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the base wagering game by making a wager via the value input device 18 of the gaming machine 10. A player can select play by using the player input device 24, via the buttons 26 or the touch screen keys 30. The base game consists of a plurality of symbols arranged in an array, and includes at least one payline 32 that indicates one or more outcomes of the base game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1A as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
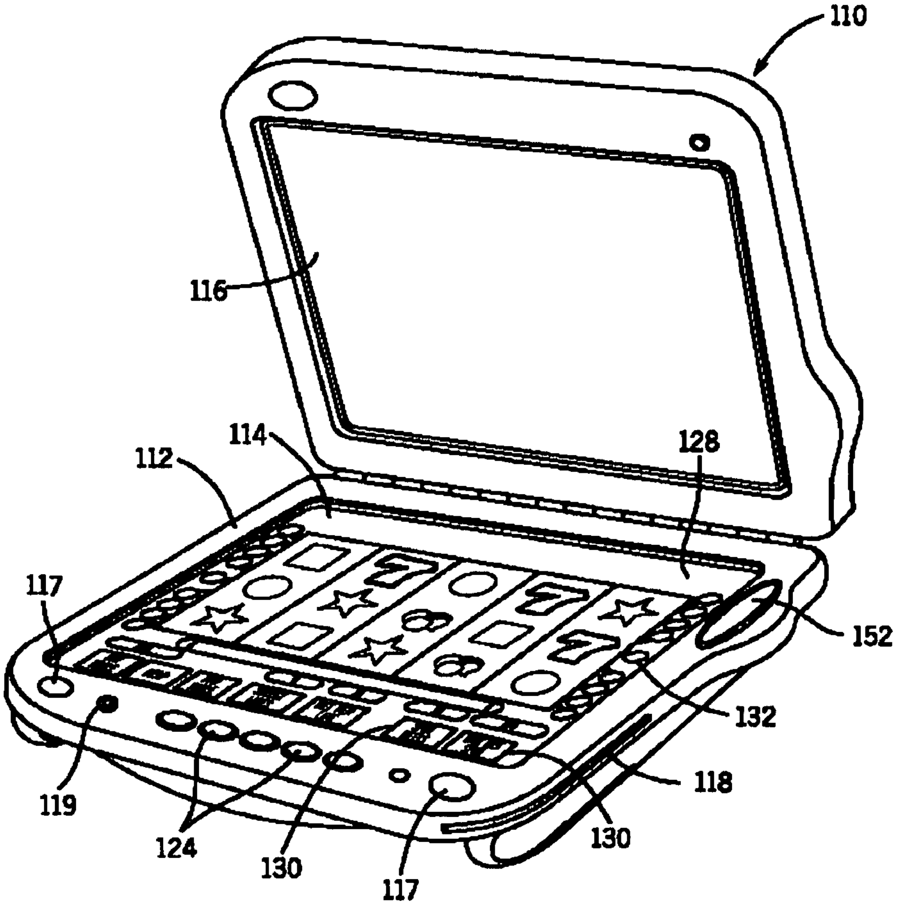
FIG. 1B is a perspective view of a handheld gaming machine embodying the present invention.

Depicted in FIG. 1B is a handheld or mobile gaming machine 110. Like the free standing gaming machine 10, the handheld gaming machine 110 is preferably an electronic gaming machine configured to play a video casino game such as, but not limited to, blackjack, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1B, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds.

In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1B, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the base wagering game on the handheld gaming machine 110 is displayed to the player on the primary display 114. The primary display 114 can also display the bonus game associated with the base wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the base wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the base game may comprise a plurality of symbols arranged in an array, and includes at least one payline 132 that indicates one or more outcomes of the base game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1B, comprises a biometric sensing device.

Figure 2:
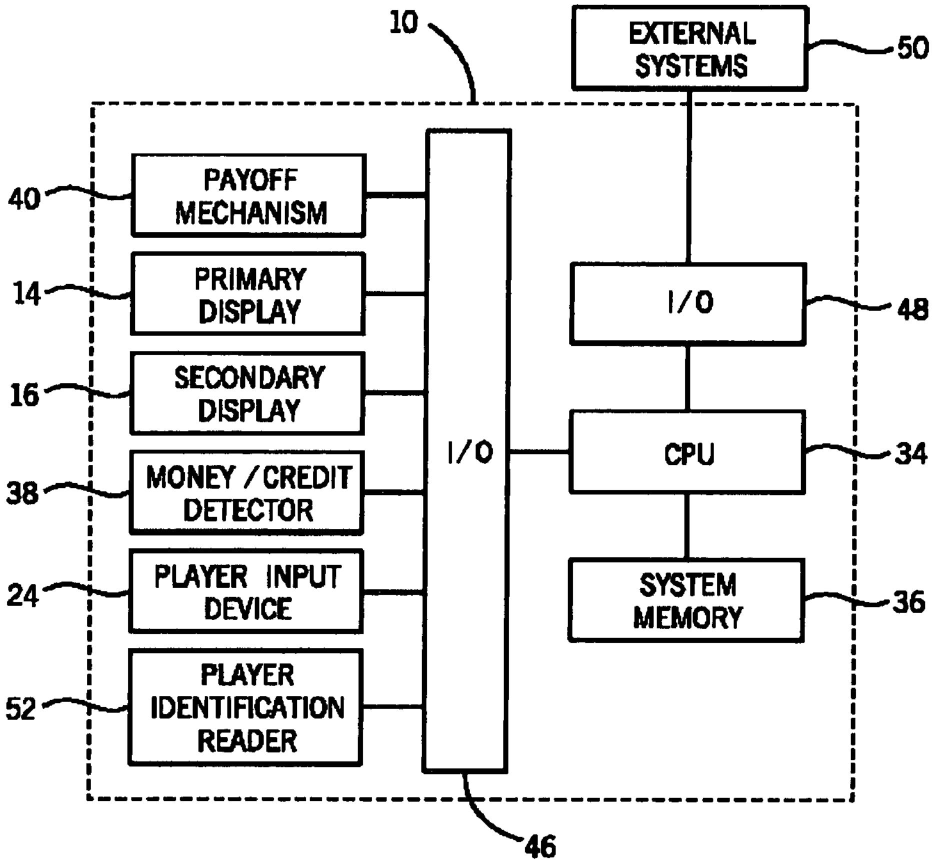
FIG. 2 is a block diagram of a control system suitable for operating the gaming machines of FIGS. 1A and 1B.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the base game or the bonus game(s). The payoff may be provided in the form of points, bills, tickets, coupons, cards, etc. For example, in FIG. 1A, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10, 110 may communicate with external systems 50 (in a wired or wireless manner) such that each machine operates as a "thin client," having relatively less functionality, a "thick client," having relatively more functionality, or through any range of functionality therebetween. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10, 110 may take on a wide variety of forms such as a free standing machine, a portable or handheld device primarily used for gaming, a mobile telecommunications device such as a mobile telephone or personal digital assistant (PDA), a counter top or bar top gaming machine, or other personal electronic device such as a portable television, MP3 player, entertainment device, etc.

Figure 3:
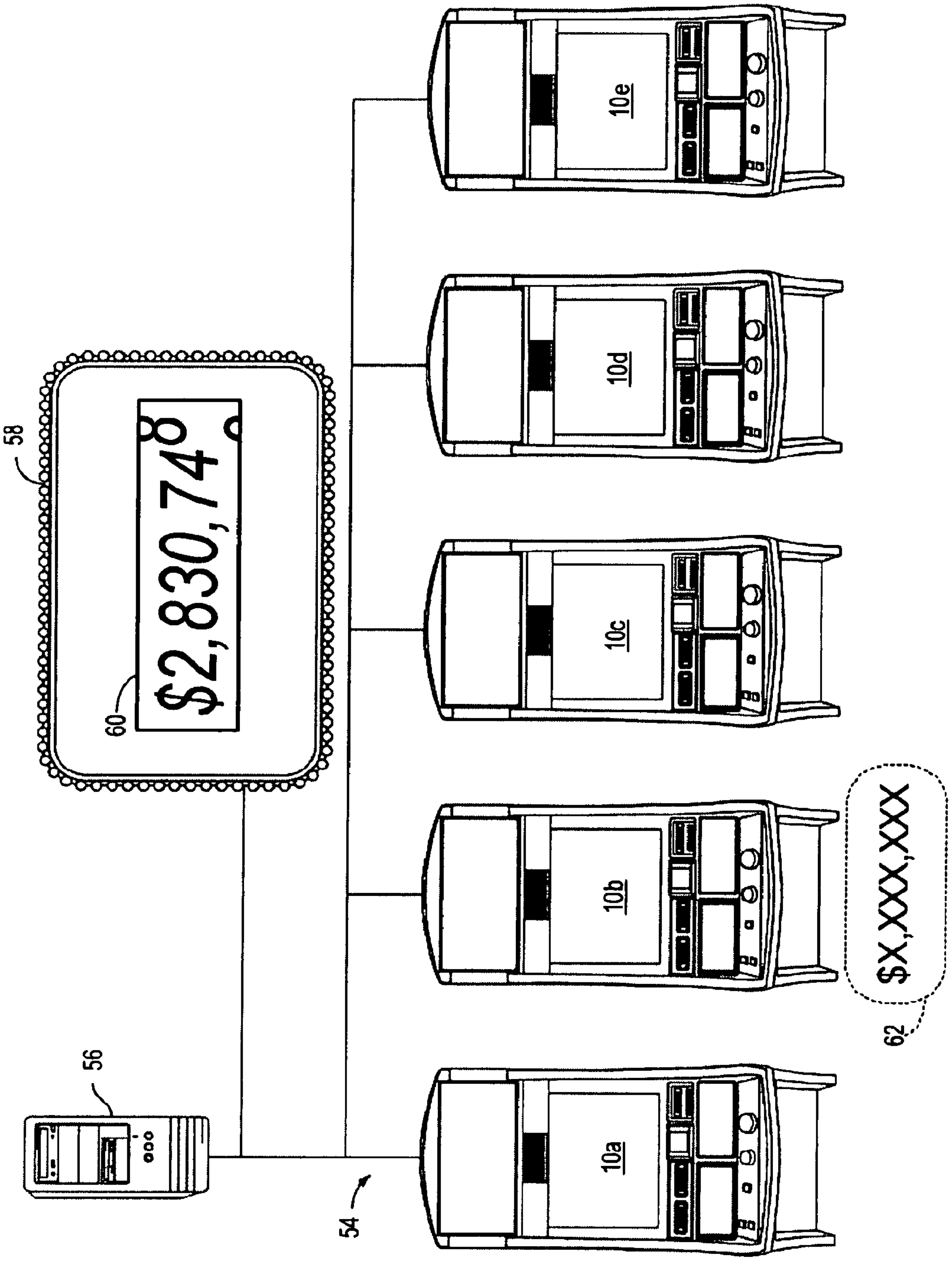
FIG. 3 illustrates a hidden credit amount for a progressive jackpot according to embodiments of the invention.

As alluded to above, in addition to being free standing, multiple gaming machines 10, 110 may also be connected together as part of a network. Such an arrangement is illustrated in FIG. 3, where a network 54 connects a plurality of gaming machines 10*a*, 10*b*, 10*c*, 10*d*, and 10*e* to each other and to a network controller 56. The network 54 may be a local area network (LAN), which may in turn be connected to a wide area network (WAN). The network 54 may also be a private network (intranet) that is in turn connected to a public network (the Internet). Such networks are well known to those having ordinary skill in the art and will not be described in detail here. Connection to the network 54 may be accomplished via any suitable network connection, such as an Ethernet or TCP/IP connection. Although only five gaming machines 10*a-e* are shown here, those having ordinary skill in the art will recognize that fewer or more gaming machines may be connected to the network 54 without departing from the scope of the invention.

The gaming machines 10*a-e* are similar to the gaming machine 10, 110 of FIGS. 1A-1B in that they have many of the same wagering game features and functionality. For example, the gaming machines 10*a-e* allow players to play a base wagering game and a bonus wagering game. Also, each gaming machine 10*a-e* may be configured to play a different base and/or bonus wagering game, or they all may be configured to play the same base and/or bonus wagering game. Furthermore, the gaming machines 10*a-e* may share a common theme, such as a Monopoly game theme, or each gaming machine 10*a-e* may have its own theme that is different from the other gaming machines 10*a-e*.

In some embodiments, one or more features or functions of the gaming machines 10*a-e* may reside on the network controller 56 instead of, or in addition to, the individual gaming machines 10*a-e*. Computer-readable media (e.g., magnetic, optical, or other data storage devices, not expressly shown) communicatively coupled to network controller 56 may be used to store computer-readable instructions for performing various operations associated with the base and bonus wagering games. The network controller 56 may then conduct the base and/or bonus games (or portions thereof) for each of the gaming machines 10*a-e* connected to the network 54, including providing the input data and information needed to operate the base and/or bonus games.

The network controller 56 may also operate one or more "progressives" concurrently with the base game and/or bonus games. As explained above, such progressives are usually funded by appropriating a percentage of the coin-in from participating gaming machines 10*a-e*. In a typical arrangement, merely playing a base game and/or bonus game on a participating gaming machine 10*a-e* automatically qualifies a player for the progressive available on that gaming machine 10*a-e* (i.e., nothing further is needed). Then, upon occurrence of one or more predetermined progressive-winning outcomes in the base game and/or bonus game, the player is awarded the progressive jackpot in addition to any regular prize or award resulting from the base game and/or bonus game.

Other aspects of progressives may include implementation on multiple levels. For example, a progressive may be implemented on a gaming machine level in which each gaming machine 10*a-e* has its own progressive, a casino level in which gaming machines 10*a-e* across a casino may participate, and a wide-area progressive in which gaming machines 10*a-e* across multiple casinos may participate. The particular progressive operated by the network controller illustrated in FIG. 3 is a casino level progressive in which signage 58, controlled by the network controller 56, continuously displays the progressive jackpot amount 60, preferably at a centralized location where players in the casino may easily see the jackpot amount. It is also possible for a single gaming machine to participate in all three types of progressives, or some intermediate combination thereof.

Because of the popularity of progressives in the gaming industry, there is a continuing need to develop gaming machines with new types of progressives as well as ones with enhanced progressive features to satisfy the demands of players and operators. Embodiments of the invention address this need as well as other needs by enhancing or otherwise customizing various aspects of the progressives over existing implementations to suit a particular application, including changing or adding the ways and requirements for becoming eligible for and winning the progressive jackpot, in order to increase player excitement and anticipation.

For example, in one embodiment of the invention, in addition to a displayed jackpot amount 60, the network controller 56 may also control a hidden amount 62 that is not visible to the player. In such an embodiment, the hidden amount 62 may represent the true or actual progressive jackpot and the displayed jackpot amount 60 may represent a lesser amount for the progressive jackpot. Thus, the displayed jackpot amount 60 lags behind the hidden amount 62 to a certain extent, depending on the selected amount of lagging. The lag may be a monetary lag (e.g., a certain percentage of the true progressive jackpot) or it may be a temporal lag (e.g., a certain time delay). Then, when a player wins the progressive, he/she is awarded the hidden amount 62 instead of the displayed jackpot amount 60, thereby giving the player an unexpected monetary boost that adds to his/her excitement and enjoyment.

In an alternative embodiment, the displayed jackpot amount 60 may be the one that represents the true or actual progressive jackpot amount, while the hidden amount 62 may be a separately funded credit amount set aside as an additional (and unexpected) monetary boost for winners of the progressive jackpot. Such a hidden amount 62 may be funded, for example, from a portion of the percentage of coin-in typically reserved for the progressive jackpot from each wager. Other ways of funding the hidden amount 62 may also be used by those having ordinary skill in the art without departing from the scope of the invention.

In either of the above embodiments, the hidden amount 62 may be awarded each time the progressive jackpot is won, or it may be awarded according to some other regular, irregular, or random (i.e., mysterious) schedule.

Figure 4:
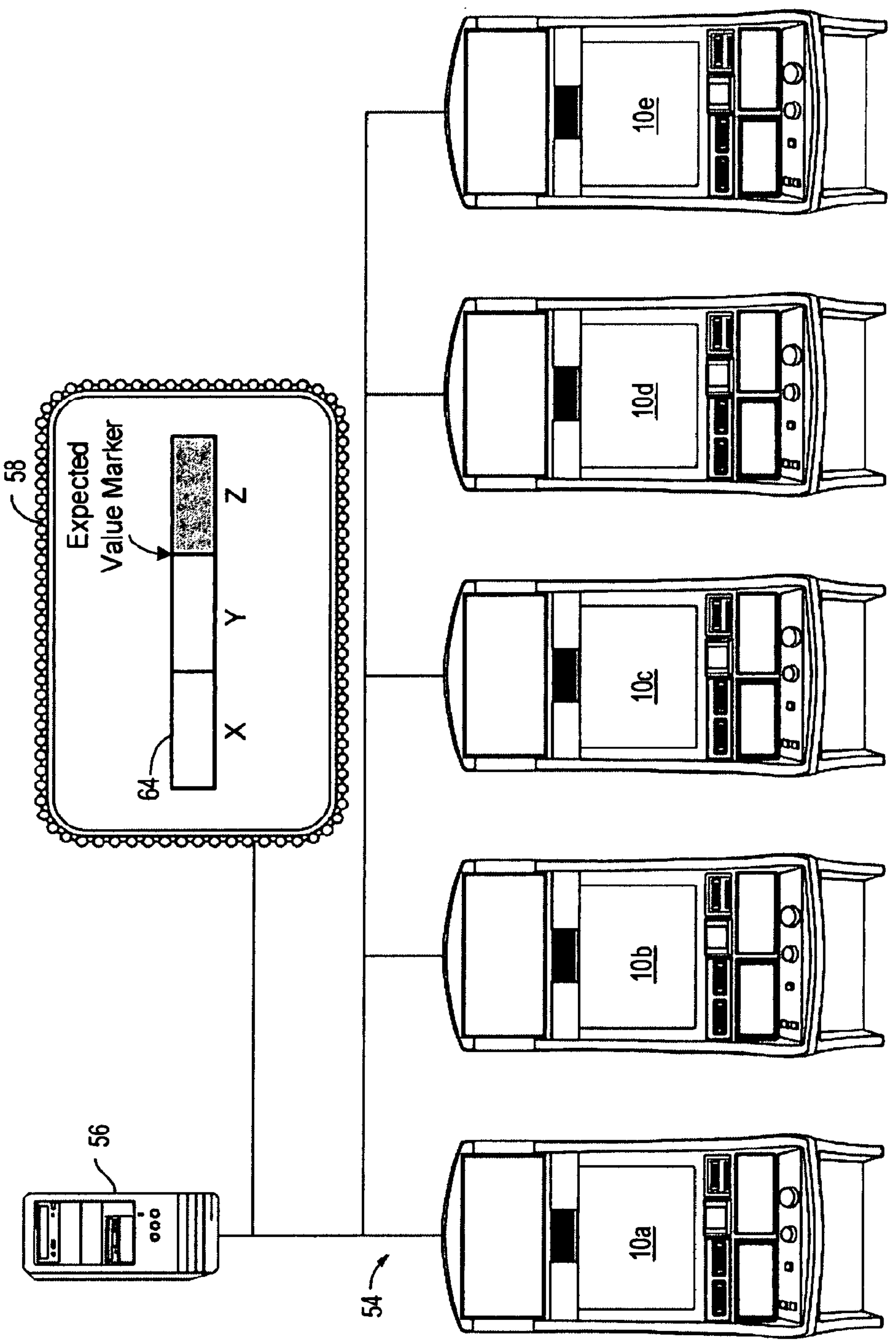
FIG. 4 illustrates sign-age for a progressive jackpot according to embodiments of the invention; strata

In another embodiment, as shown in FIG. 4, a graphical indicator 64 may be displayed on the signage 58 instead of a numerical value for the progressive jackpot. Such a graphical indicator may be composed of one or wedges in a pie chart, or one or more bars in a bar graph, and the like, that illustrate the progress of the progressive jackpot in real time. In the example shown here, a meter 64 may be used having segments X, Y, and Z that fill in or light up one by one (if multiple discrete segments) with a different color (e.g., red, blue, green, etc.) or a different shade or intensity of the same color to indicate the progress of the progressive jackpot. Each one of the segments X, Y, and Z may represent either a relative credit amount or a relative pendency interval for the progressive jackpot, as opposed to absolute values for these measurements. Thus, players are able to graphically see the progressive jackpot advance, but must guess as to the credit amount or the pendency, thereby further adding to the excitement and anticipation of the players. In some embodiments, an expect value marker, such as "Strike" or the like, may be displayed on the graphical indicator 64 to indicate the point where the progressive jackpot is past its theoretical average in terms of either the credit amount or pendency.

Although the graphical indicator 64 is shown as appearing on the signage 58, it is also possible to display the graphical indicator 64 on each individual gaming machine 10*a-e* instead or in addition to the signage 58. Furthermore, although the graphical indicator 64 is implemented in place of a numerical credit amount for the progressive jackpot, it is also possible to implement the graphical indicator 64 in conjunction with the numerical credit amount so that players receive the benefit of both features. For example, one feature may be displayed on the signage 58 while the other may be displayed on the individual gaming machines 10*a-e*, or vice versa. Or both the graphical indicator 64 and the numerical credit amount may be displayed on the signage 58 and/or the individual gaming machines 10*a-e*.

Figure 5:
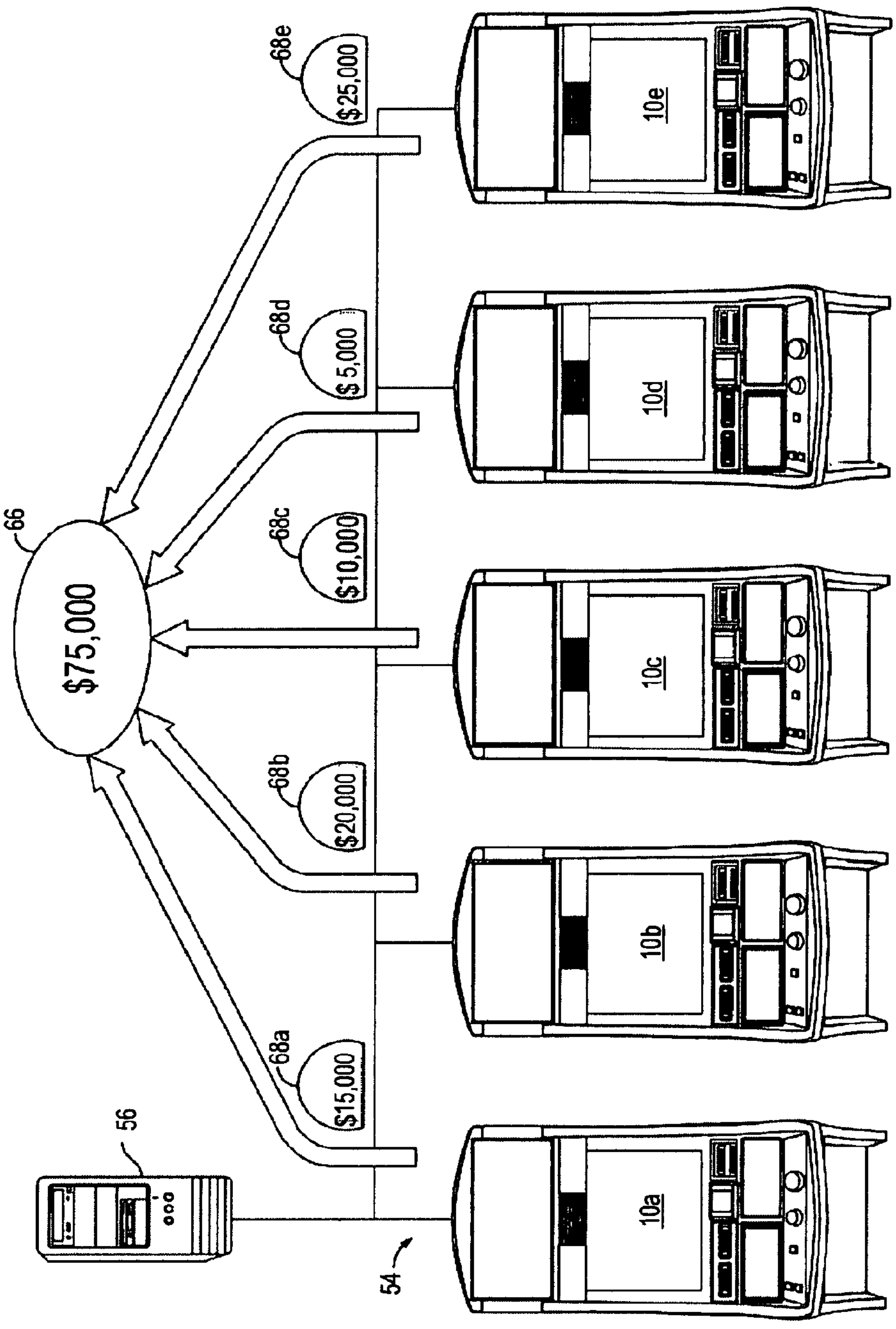
FIG. 5 illustrates a combined progressive jackpot according to embodiments of the invention.

In some embodiments, instead of separate progressive jackpots at the LAN level and at the WAN level, the LAN level progressives may be combined to provide a WAN level progressive. This is illustrated in FIG. 5, where each gaming machine 10*a-e* in the network 54 has its a LAN level progressive jackpot 68*a*, 68*b*, 68*c*, 68*d*, and 68*e*. Players at the gaming machines 10*a-e* may become eligible for and win the LAN level progressive jackpots 68*a-e* independently of any WAN level progressive jackpots. In accordance with embodiments of the invention, the LAN level progressive jackpots 68*a-e* may be combined to form a combination progressive jackpot 66 at the WAN level. Thus, the size of a combination progressive jackpot 66 depends on the credit amounts of the LAN level progressive jackpots 68*a-e*. Such a combination progressive jackpot 66 may be implemented as an award for a winning outcome, as a random feature so that it appears mysterious to the players, or it may be implemented on some regular or irregular basis. The combination may be also initiated by the network controller 56, or it may be initiated by the player (possibly after depositing additional credits). Players may then be awarded the combination progressive jackpot 66 together with or independently of the LAN level progressive jackpots 68*a-e* (i.e., a player may win both jackpots).

In some embodiments, the combination progressive jackpot 66 may be awarded in place of the LAN level progressive jackpots 68*a-e*. To this end, the wagering game outcomes that cause the players to become eligible for and/or win the LAN level progressive jackpots 68*a-e* may also be used for the combination progressive jackpot 66, or a different set of eligibility and/or winning outcomes may be used for the combination progressive jackpot 66. Where the combination progressive jackpot 66 is awarded together with the LAN level progressive jackpots 68*a-e*, the same set of eligibility and/or winning outcomes may be used for both jackpots. Where the combination progressive jackpot 66 is awarded independently of the LAN level progressive jackpot 68*a-e*, a different set of eligibility and/or winning outcomes may be used. It is also possible to combine a plurality of gaming machine level (i.e., standalone) progressive jackpots into a LAN level progressive jackpot instead of (or in addition to) combining the LAN level progressive jackpots into a WAN level progressive jackpot.

Figure 6:
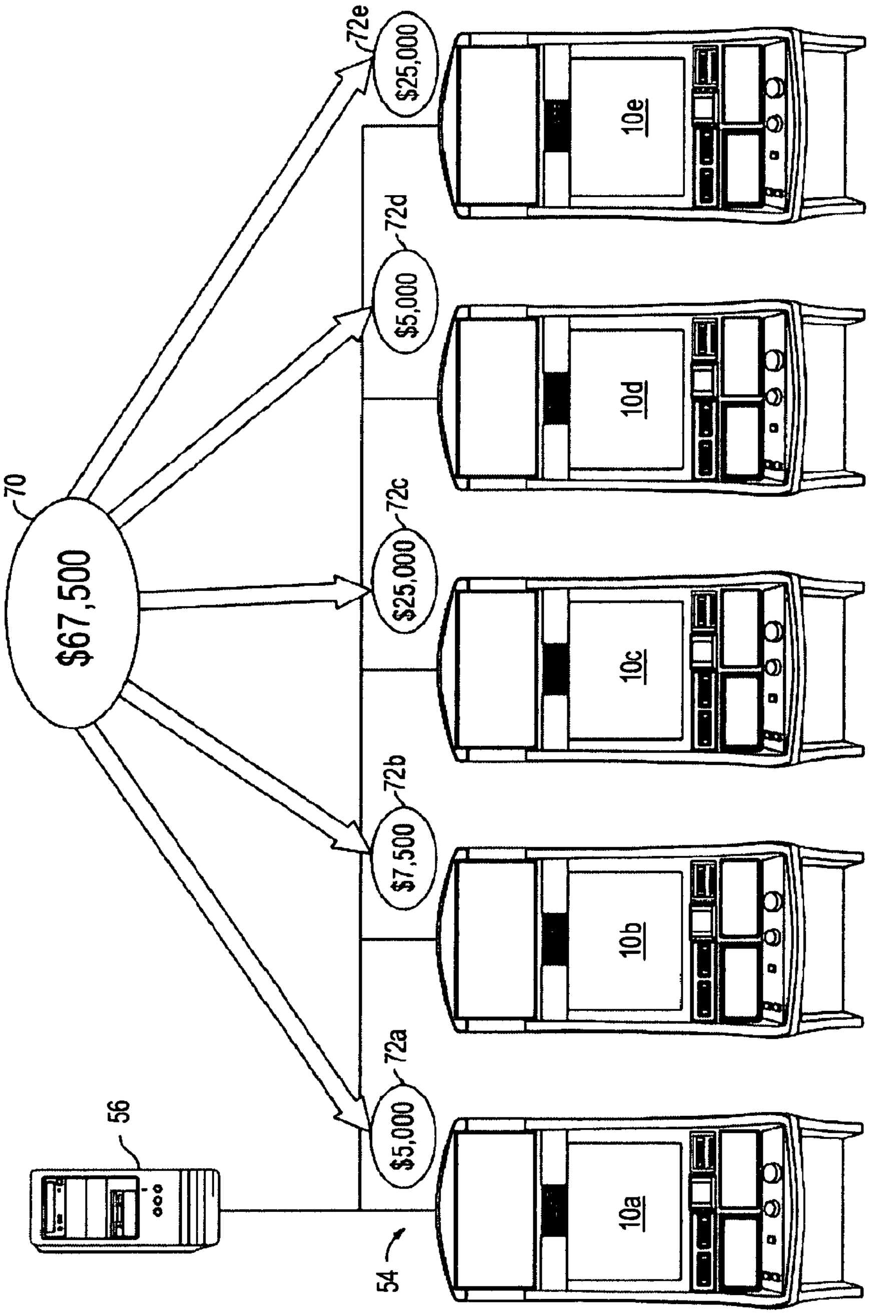
FIG. 6 illustrates an apportioned progressive jackpot according to embodiments of the invention.

FIG. 6 illustrates an alternative embodiment where a WAN level progressive jackpot 70 may be apportioned among multiple LAN level progressive jackpots 72*a*, 72*b*, 72*c*, 72*d*, and 72*e*. These LAN level progressive jackpots 72*a-e* may be awarded in place of the WAN level progressive jackpot 70, or they may be awarded in addition to the WAN level progressive jackpot 70 (either together therewith or independently thereof). The portion of the WAN level progressive jackpot 70 apportioned to each gaming machine 10*a-e* may depend, for example, on the amount of coin-in contributed by that gaming machine 10*a-e* to the WAN level progressive jackpot 70. As before, the wagering game outcomes used for the WAN level progressive jackpot 70 and the LAN level progressive jackpots 72*a-e* may be the same, or they may be different. Also, the feature may be implemented as an award for a winning outcome, a random feature (i.e., a mystery feature), or it may be implemented on some regular or irregular basis. And similarly to the previous embodiment, it is also possible to apportion a LAN level progressive jackpot into a plurality of gaming machine level (i.e., standalone) progressive jackpots instead of (or in addition to) apportioning the WAN level progressive jackpot into a plurality of LAN level progressive jackpots.

Figure 7:
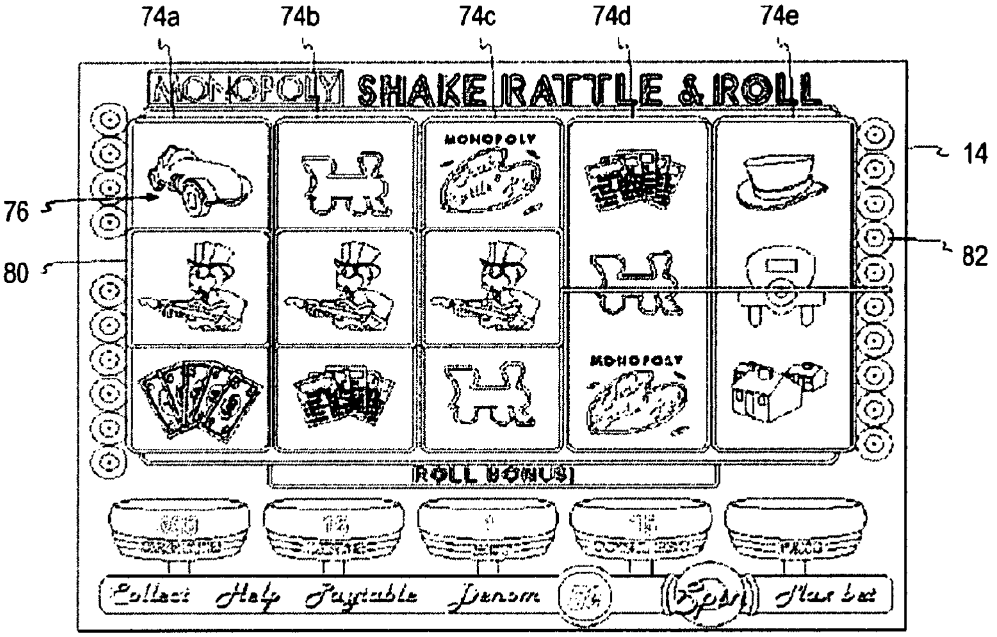
FIG. 7-12 illustrate aspects of eligibility and/or winning a progressive jackpot according to embodiments of the invention.

In addition to providing multiple ways of implementing the progressive jackpot, embodiments of the invention also provide multiple ways of winning the progressive jackpot. For example, instead of the traditional all-or-nothing approach, a portion of the progressive jackpot may be awarded if there is a partial match between an outcome in the base game and/or bonus game and the one or more progressive-winning outcomes. This arrangement is depicted in FIG. 7, where a wagering game is displayed on the primary display 14 of one of the gaming machines 10*a-e*. The particular wagering game shown here, which may be a base game or a bonus game, is a multi-line, five-reel video slot machine game. Each reel 74*a*, 74*b*, 74*c*, 74*d*, and 74*e* includes a plurality of symbols, one of which is shown at 76. A plurality of paylines, one of which is indicated at 78, identifies the possible symbol combinations for winning the base game or the bonus game. Only three symbols 76 are visible at any given time on each reel 74*a-e*, resulting in a three-by-five array of symbols. Of course, other types of wagering games (e.g., poker, blackjack, keno, etc.) may also be used without departing from the scope of the invention.

In the particular wagering game of FIG. 7, the same symbol must align on any given payline in order for the outcome to constitute a progressive-winning outcome. However, in accordance with embodiments of invention, a portion of the progressive jackpot may be awarded if there is a near-match between the base game and/or bonus game outcome and the progressive-winning outcome, with the degree of nearness or partialness or completeness of the near-match being defined as needed by the casino operator. Such a near-match feature may be a regularly occurring feature or it may be randomly triggered event. In one implementation, three or more of the same symbols in a row may constitute a near-match outcome, with more of the same symbols in a row resulting in a larger portion of the progressive jackpot. In the example of FIG. 7, three of the Mr. Monopoly symbols 80 have lined up on a payline, which is normally not a progressive-winning outcome. However, in accordance with embodiments of the invention, the three Mr. Monopoly symbols 80 is a near-match outcome that results a portion of the progressive jackpot being awarded to the player. Other near-match combinations are possible, including three or more of the same symbols anywhere on the payline (i.e., not necessarily in a row). Where multiple progressives are in play (e.g., a matrix progressive, discussed later herein), it is also possible for the completeness of the near-match to determine a subset of the progressives won out of a total number of available progressives (e.g., three out of nine progressives, etc.).

The portion of the progressive jackpot awarded for a near-match may be defined as needed by the casino operator. For example, the portion of the progressive jackpot awarded may correspond to the percentage of symbols matched (e.g., 60% awarded for three out of five symbols matched, 80% awarded for four out of five symbols matched, etc.). In other implementations, the progressive jackpot may be apportioned ahead of time into a number of mini progressive jackpots of varying sizes. One of the mini progressive jackpots may then be awarded when one of the near-match outcomes is achieved. Preferably, the size of the particular mini progressive jackpot awarded corresponds to the degree of completeness of the near-match, but it is certainly possible for there to be no correlation (i.e., the mini progressive jackpots are randomly awarded).

Sometimes, a player is unable to achieve even a near-match, much less any kind of winning outcome. While non-winning outcomes are to be expected in any wagering game, it is unusual for the lack of winning to continue for an extended period of time. Indeed, certain wagering games are designed so that the probability of achieving a non-winning outcome is statistically very low. For example, in a free-spins game, it is very unlikely for a player to complete all the free spins without one of the spins resulting in a credit award. Similarly, in a player-selection game, it is unusual for a player to select a game-termination symbol with the very first pick in the game. These types of low probability lack of achievement outcomes are commonly referred to as "bad beat jackpots." A player who manages to achieve such a bad beat jackpot has, in essence, overcome the same or similar probability hurdles as a player who achieves a winning outcome. Accordingly, in some embodiments of the invention, these players may be rewarded for their lack of achievement.

Figure 8:
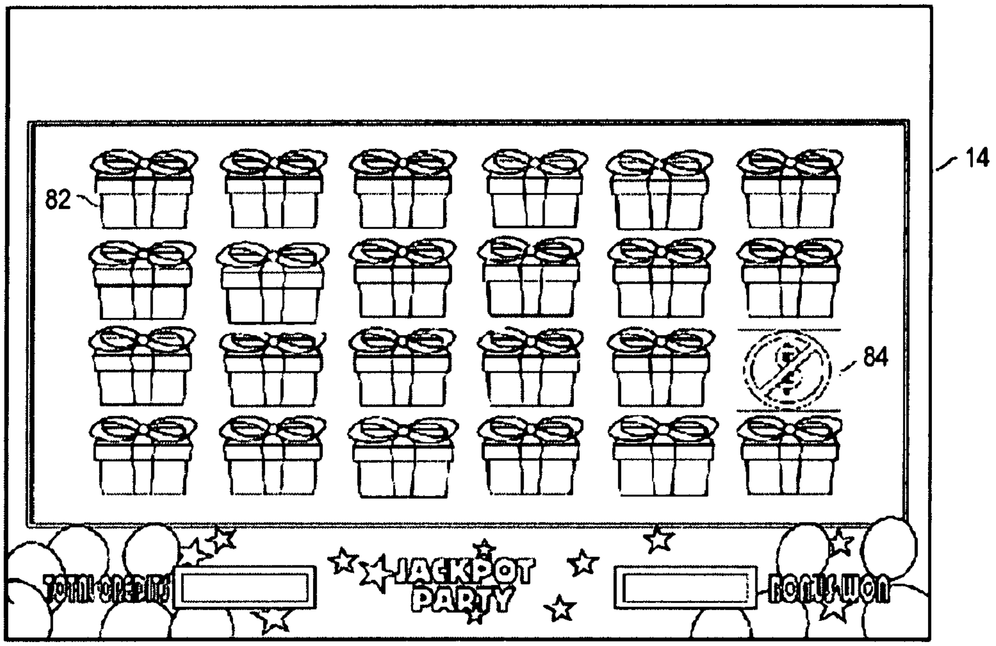

An example of a lack of achievement in a wagering game is illustrated in FIG. 8, where a player-selection game is displayed on the primary display 14. In this wagering game, participating players are presented with an array of picks in the form of presents 82 or similar items from which they may select. When selected, each present 82 reveals either a prize (e.g., a credit amount), or a game-termination symbol 84. The number of picks 82 that are credit amounts versus those that are game-termination symbols 84 may vary from session to session, but in general, there are more credit amounts than there are game-termination symbols 84. Therefore, the probability that the player will select a game-termination symbol 84 before selecting a credit amount is statistically low. Thus, when the player does manage to achieve such a result, he/she is awarded the progressive jackpot.

Other low probability lack of achievements that may be rewarded include, for example, selecting a keno card with zero matching numbers, obtaining a straight flush only to be immediately trumped by a royal flush, and so forth. Preferably, the probability associated with the non-winning outcome or series of non-winning outcomes is lower than the probability of at least one winning outcome. In addition, the reward for the lack of achievement is not prominently promoted or advertised to prevent players from playing for the result (although it may certainly be touted in some cases as a feature of the gaming machine). To this end, the feature may be activated randomly so that it appears mysterious to the players, or it may be activated on some regular or irregular basis.

To win the progressive jackpot, the player must first be eligible for the progressive jackpot. Accordingly, some of the ways of winning a progressive jackpot discussed above may also (or instead) be used to gain eligibility for the progressive jackpot. The lack of achievement feature is one example that may be used to qualify the player for the progressive jackpot. Once eligible, the player must additionally achieve a progressive-winning outcome in order to win the progressive jackpot. In general, embodiments of the invention may use the same winning outcomes in a base game, bonus game, and/or progressive to trigger progressive eligibility. Alternatively, the outcomes that trigger progressive jackpot eligibility may be entirely different from those that constitute a progressive-winning outcome.

Once eligibility is obtained, the duration of the progressive eligibility may vary according to the particular gaming application. For example, in some embodiments, the eligibility may last indefinitely (i.e., until the player wins the progressive jackpot), for a predetermined period of time, or it may only last a single wagering game session or a predetermined number of wagering game sessions. In other embodiments, the progressive eligibility may last until a predetermined eligibility-termination event, outcome, or game symbol is achieved, which may be the same as that used to obtain progressive eligibility to begin with, or it may be a different event, outcome, or game symbol. Following are a few exemplary implementations of ways to become eligible for a progressive jackpot according to embodiments of invention.

Figure 9:
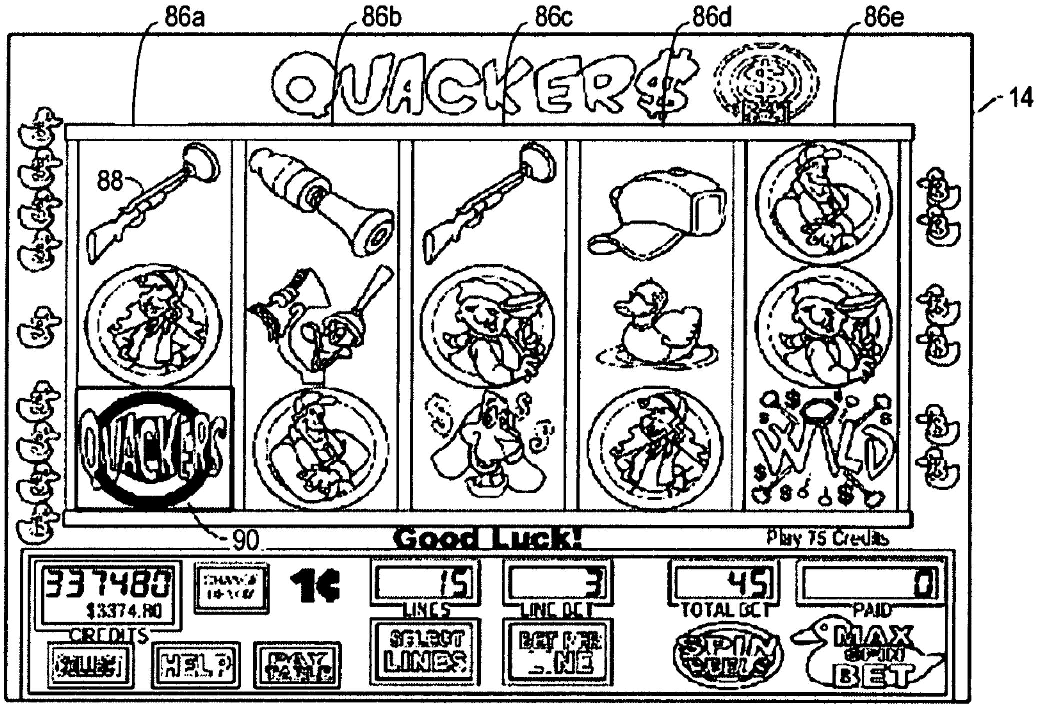

Referring to FIG. 9, in some embodiments, players may become eligible for a progressive jackpot by obtaining a designated game symbol during a wagering game. The particular wagering game shown here, which may be a base game or a bonus game, is a multi-line, five-reel video slot machine game. As can be seen, each reel 86*a*, 86*b*, 86*c*, 86*d*, and 86*e* includes a plurality of reel symbols, one of which is shown at 88. In accordance with embodiments of invention, one of the reel symbols, for example, the "Quackers" symbol, is designated beforehand as the progressive-eligibility symbol 90. In some embodiments, the designated symbol may continue to form part of the various winning and non-winning outcomes of the wagering game. The designation may be made by the wagering game (i.e., by default), or it may be made by the player (possibly upon payment of a fee), or both types of designations may occur over the course of several wagering game sessions. The designations may be renewed with each session of the wagering game, or they may be retained on a more extended basis (e.g., daily, weekly, monthly, etc.). Regardless, when the progressive-eligibility symbol 90 appears anywhere on the reels 86*a-e*, the player becomes eligible for the progressive jackpot.

In some embodiments, the wagering game and/or the player may also designate a particular location for the progressive-eligibility symbol 90. For example, the progressive-eligibility symbol 90 may be required to appear on one or more particular reels 86*a-e* in order for the player to become eligible for the progressive jackpot. Alternatively, the progressive-eligibility symbol 90 may be required to appear in one or more particular reel positions (e.g., top position, middle position, bottom position). It is also possible to require the progressive-eligibility symbol 90 to appear in a certain pattern on the reels 86*a-e*, such as a cross pattern, an "X" pattern, at all four corners, and the like, in order for the player to gain eligibility for the progressive jackpot.

Figure 10:
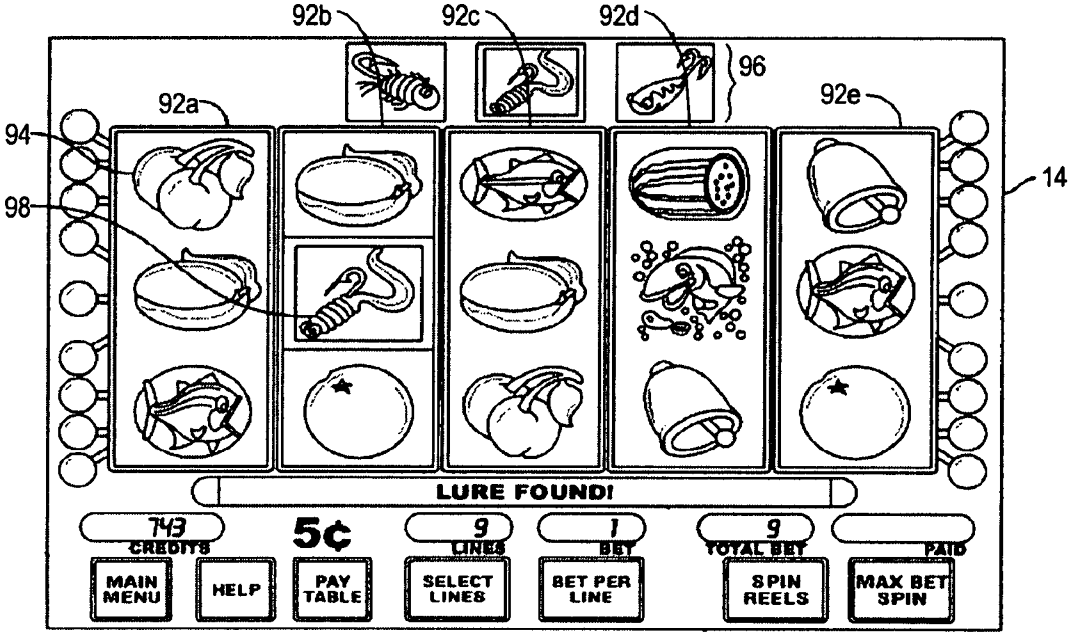

In some embodiments, instead of a single type of progressive-eligibility symbol 90, the wagering game may require the player to collect several types of progressive-eligibility symbols to become eligible for the progressive jackpot. These progressive-eligibility symbols may be collected in the same wagering game session, or they may be collected and retained over multiple wagering game sessions. An exemplary implementation of these embodiments is illustrated in FIG. 10, which shows multiple progressive-eligibility symbols being collected. As in previous embodiments, the wagering game shown here is a multi-line, five-reel video slot machine game, with each reel 92*a*, 92*b*, 92*c*, 92*d*, and 92*e* having a plurality of reel symbols 94. In accordance with this embodiment, a set 96 of reel symbols has been designated ahead of time as progressive-eligibility symbols 98. The designation may be made by the wagering game, or it may be made by the player (possibly for a fee), or both scenarios may occur over the course of several wagering game sessions. The player must then collect every progressive-eligibility symbol 98 in the set 96 of reel symbols to be eligible for the progressive jackpot.

In one implementation, the player's collection is credited with a designated progressive-eligibility symbol 98 whenever that symbol appears anywhere on the reels 92*a-e*. In other implementations, however, the progressive-eligibility symbol 98 may be required to appear on one or more particular reels 92*a-e* in order for the player to be credited with that symbol. Alternatively, no particular reel 92*a-e* is required, but the progressive-eligibility symbol 98 may be required to appear in one or more particular reel positions (e.g., top position, middle position, bottom position). It is also possible to require the progressive-eligibility symbols 98 to appear both on a particular reel 92*a-e* and in a particular position, or to appear in a certain pattern. In any event, once the player has collected all the progressive-eligibility symbols 98 in the set 96, he/she becomes eligible for the progressive jackpot.

Figure 11:
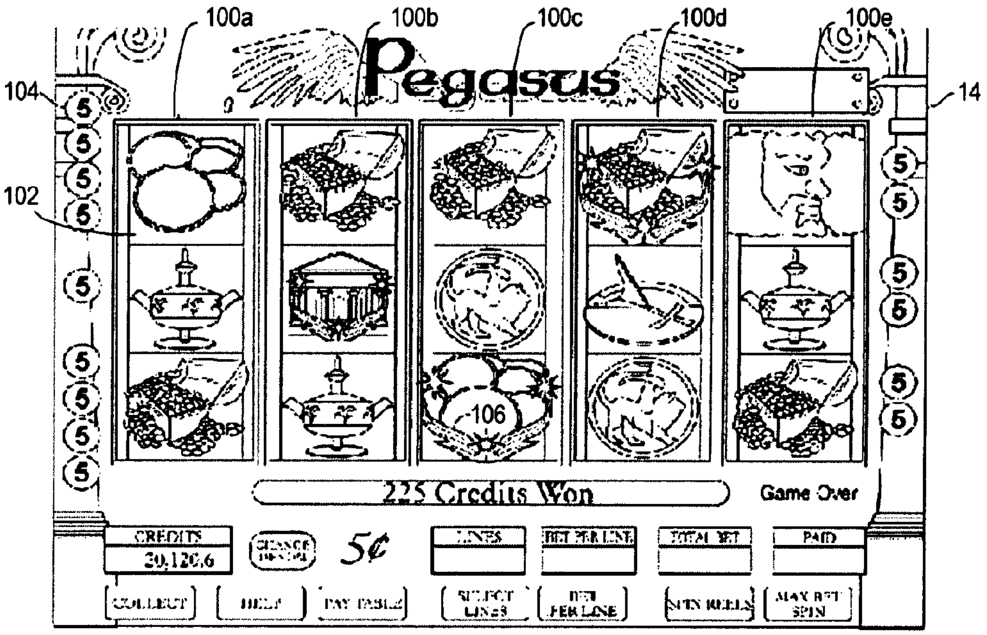

In some embodiments, instead of a particular reel location or reel position, a secondary indicia may be used to determine progressive jackpot eligibility. An exemplary implementation of this embodiment is illustrated in FIG. 11, where a multi-line, five-reel video slot machine game is again shown, with each reel 100*a*, 100*b*, 100*c*, 100*d*, and 100*e* having a plurality of reel symbols 102. A plurality of paylines 104 identifies the possible alignment of symbols that result in a winning outcome. In accordance with embodiments of the invention, a secondary indicia 106 may be randomly placed on or otherwise associated with one or more reel symbols 102. When the secondary indicia 106 appears on one of the specific reel symbols 102 (or several reel symbols 102) that has been designated as a progressive-eligibility symbol (see FIGS. 9 and 10), the player becomes eligible for the progressive jackpot. The secondary indicia 106 in this example are a pair of wings (as in the wings of Pegasus), but any suitable indicia may be used as the secondary indicia (e.g., dice, tokens, playing cards, etc.) without departing from the scope of the invention.

In some embodiments, the secondary indicia 106 may also be used to play one or more secondary games, successful completion of which qualifies the player to participate in the progressive jackpot. The secondary games may be played simultaneously with the base game, preferably in the background or otherwise as an integrated component of the base game. An example of such a simultaneous secondary game is a Bingo game in which the secondary indicia 106 include one or more Bingo numbers. At the same time the player is playing the base game, he/she is also filling in a Bingo card (not expressly shown) using the Bingo numbers in the secondary indicia 106. When the player achieves a "Bingo," he/she becomes eligible for a progressive jackpot. Alternatively, the secondary game may be played in conjunction with, but separately from, the base game. For these embodiments, the secondary game may be similar to typical bonus games known to those having ordinary skill in the art and will therefore not be described here.

Figure 12:
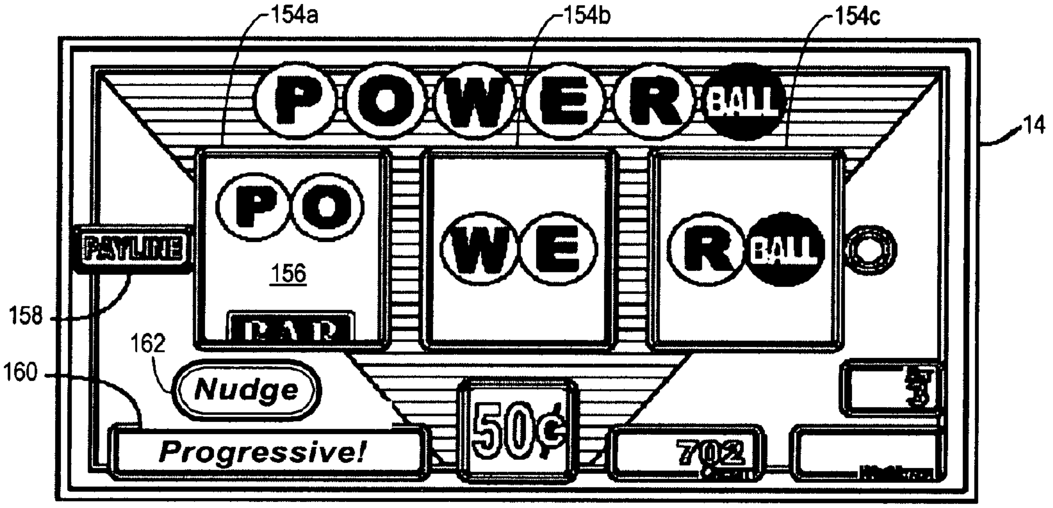

In some embodiments, instead of winning the progressive eligibility, players may purchase the progressive eligibility by depositing an additional credit amount. The player may purchase the progressive eligibility directly, or they may purchase an opportunity to become eligible for the progressive, for example, by placing a side bet. An example of the latter case is illustrated in FIG. 12, where a three-reel slot machine wagering game is shown, each reel 154*a*, 154*b*, and 154*c* having a plurality of reel symbols 156. A payline indicator 158 identifies the payline, and a progressive eligibility indicator 160 textually and/or graphically announces when progressive eligibility is achieved.

Progressive eligibility is achieved when the reels 154*a-c* form the word "POWERBALL" across the payline. In the example shown, the "PO" reel symbol 156 on the first reel 154*a* does not quite line up on the payline (indicated by the payline indicator 158), resulting in the player just missing the progressive eligibility. In accordance with embodiments of the invention, however, the player may try and win the progressive eligibility via a side bet by depositing an additional credit amount. In this particular embodiment, the side bet is in the form of a "nudge" that may be used to move the "PO" reel symbol 156 onto the payline. In general, the side bet may assume any suitable form known to those having ordinary skill in the art. After depositing the additional credit amount, the player is allowed to perform the nudge, for example, by pressing a nudge button 160. If the nudge is successful and the reel "PO" symbol 156 settles onto the payline (i.e., the player wins the side bet), he/she becomes eligible for the progressive jackpot. The progressive eligibility indicator 160 thereafter lights ups or otherwise announces the progressive eligibility accordingly.

Figure 13A:
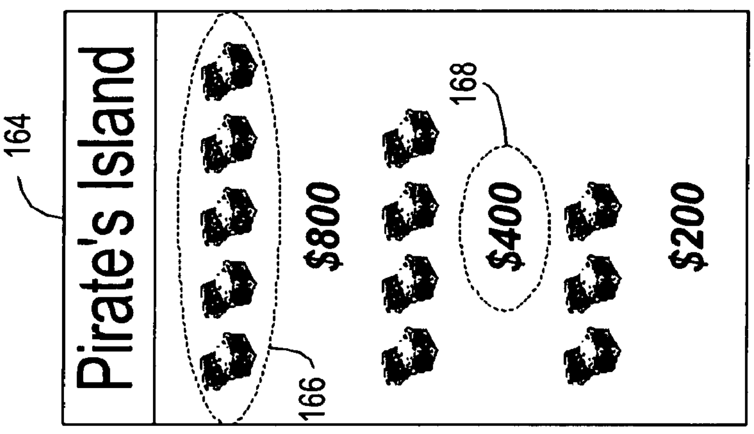
FIGS. 13A-13C illustrate a pay table for a wagering game having a progressive jackpot according to embodiments of the invention.
Figure 13B:
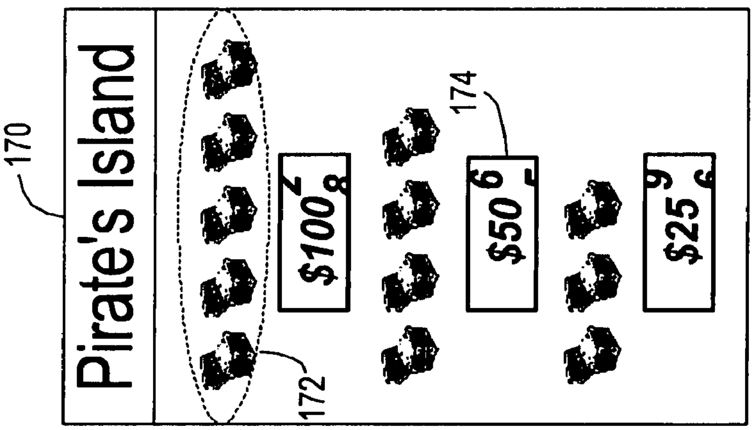
Figure 13C:
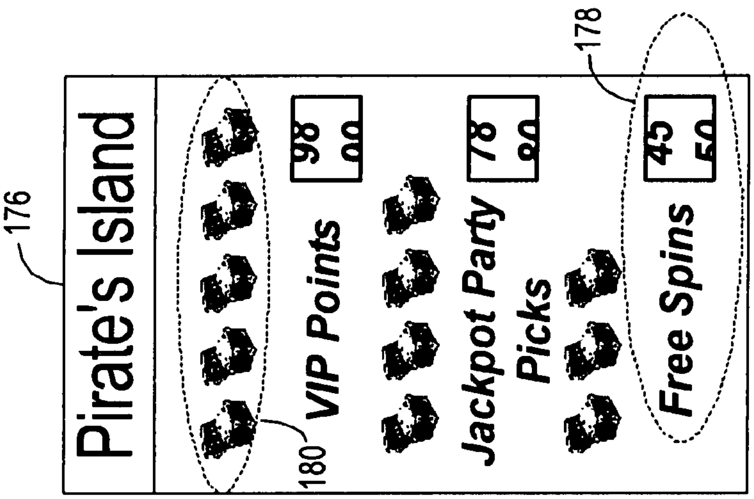

In some embodiments, instead of (or in addition to) the progressive eligibility indicator 160, progressive eligibility may also be manifested by displaying a progressive pay table on the primary display 14. An example of this embodiment is illustrated in FIGS. 13A-13C, where both a standard pay table and a progressive pay table are shown by way of comparison for a wagering game called "Pirate's Island." As can be seen in FIG. 13A, a standard pay table 164 lists several winning symbol combinations 166 along with the payout amounts 168 therefor. When a player achieves one of the winning symbol combinations 166, he/she is awarded the payout 168 corresponding to the winning symbol combination 166.

When the player becomes eligible for a progressive jackpot, the standard pay table 164 is converted into the progressive pay table 170. If the player subsequently achieves a winning outcome in the wagering game during the eligibility period, he/she is awarded one of the awards from the progressive pay table 170. The progressive pay table 170, like the standard pay table 164, lists several winning symbol combinations 172 along with the progressive jackpots 174 accruing therefor. In the particular embodiment shown, the winning symbol combinations 172 represent various tiers of progressive jackpots that may be won, with each tier being a multiple (e.g., 2×, 3×, 4×, etc.) of the other tiers in some cases. These winning symbol combinations 172 may be the same as the winning symbol combinations 166 in the standard pay table 164, or they may be different. In any event, when a player achieves one of the winning symbol combinations 172 during the eligibility period, he/she is awarded one of the progressive jackpots 174 corresponding to that winning symbol combination 172. In some embodiments, the progressive pay table awards may be awarded in addition to, or instead, of the standard pay table awards.

Furthermore, instead of monetary progressive jackpots 174, in some embodiments, the various progressive jackpots may be awarded using non-monetary awards. FIG. 13C illustrates this embodiment of the invention. As can be seen, instead of credit amounts, the progressive pay table 176 here lists non-monetary awards 178 for each winning symbol combination 180. Examples of such non-monetary awards may include player's club points, credit multipliers, extra picks in a player-selection game, additional spins in a free-spins game, and the like. The non-monetary awards may be fixed amounts, or they may be allowed to continually accrue in much the same way that monetary awards accrue. The player may then redeem these non-monetary awards in a manner known to those having ordinary skill in the art upon occurrence of a winning symbol combination. The non-monetary awards may be awarded in addition to or instead of the standard pay table awards The progressive pay tables 170 and 176 are typically displayed after the player obtains his/her progressive eligibility, regardless of whether he/she obtained it by a winning outcome, a side bet, or some other means. However, where the player may directly purchase eligibility for one of the tiers of progressive jackpots represented by the winning symbol combinations 172, the progressive pay table 170 may be displayed before the player actually purchases his/her progressive eligibility in order to aid the player's selection. Where the various tiers of progressive jackpots are multiples of each other, when the player purchases one of the tiers, he/she is essentially purchasing a multiplier for the progressive jackpots.

In some embodiments, instead of purchasing eligibility for a single progressive jackpot, the player may select multiple available progressive jackpots. For example, in a matrix type progressive, a player may choose one progressive from an array of progressives that are available. An example of a 3×3 matrix progressive is illustrated in TABLE 1 below, with the progressive identified by a number-color combination. More information regarding matrix progressives may be found, for example, in published international application No. WO06014990A2. In accordance with embodiments of the invention, instead of a single progressive jackpot, the player may select an entire row, an entire column, or an entire diagonal of progressive jackpots. For example, the player may purchase eligibility for all the "blue" progressive jackpots, or all the progressive jackpots in the "A" column, and so forth. The player may also choose multiple individual progressives (i.e., without choosing an entire, row column, or diagonal).

TABLE 1

| | A | B | C |
|---|---|---|---|
| Red | Progressive 1 | Progressive 2 | Progressive 3 |
| Blue | Progressive 4 | Progressive 5 | Progressive 6 |
| Green | Progressive 7 | Progressive 8 | Progressive 9 |

In addition to the progressive eligibility and winning aspects discussed above, embodiments of the invention also provide operational enhancements for the progressive jackpots. For example, in a typical progressive, the progressive jackpot is immediately reset each time the progressive is won. However, in accordance with embodiments of the invention, the reset is delayed and the jackpot continues to build until a predetermined progressive resetting event occurs or other criteria met. The predetermined progressive resetting event may include, for example, awarding a minimum number of progressive jackpots (e.g., three jackpots) since the last reset, delaying a minimum length of time (e.g., one week) since the last reset, exceeding a minimum individual jackpot amount (e.g., $5,000) since the last reset, or exceeding a maximum sum total awarded (e.g., $10,000) for all jackpots since the last reset. Until the predetermined progressive resetting event occurs or other criteria met, the progressive jackpot is not reset immediately after a progressive-won, but is instead allowed to continue building.

In addition, instead of resetting the progressive jackpot to the same predetermined reset amount, the amount to which the progressive jackpot is reset may be variable. Such an arrangement helps optimize the initial size of the jackpot according to the current level of wagering activity, thereby improving player excitement and anticipation. In one exemplary implementation, the reset amount may be varied by reserving a portion of the coin-in used to fund the current progressive jackpot (typically 1% of the wager amount), then using the reserved portion to vary the reset value of the next progressive jackpot. Furthermore, the variations in the funding percentage may be calculated to optimize the rate at which the jackpot grows, thereby further improving player excitement and anticipation. Both of these variations may be based on a number of factors, including the level of wagering activity (e.g., peak, off-peak), the time of day (e.g., morning, evening), the season of the year (e.g., holiday, non-holiday), and so forth. TABLE 2 below summarizes one specific implementation of the variations in the reset amount and the funding percentage for a sequence composed of three consecutive progressive jackpots.

TABLE 2

| Session | Reset Amount | % Coin-in to Meter | % Coin-in Reserved |
|---|---|---|---|
| 1 | $1,000 | 0.5% | 0.5% |
| 2 | $1,500 | 0.75% | 0.25% |
| 3 | $1,200 | 0.6% | 0.4% |

As can be seen in the above table, the first progressive jackpot has a reset amount of $1,000. During this session, only 0.5% of the coin-in is used to fund the progressive (instead of the usual 1.0%) while another 0.5% is held in reserve. This causes the progressive jackpot to grow at a different rate than if the full 1.0% of coin-in had been used. Upon occurrence of a reset event (e.g., a player wins the progressive jackpot), the progressive jackpot is reset to $1,500 instead of $1,000, with the difference made up using the amount of coin-in held in reserve. During the second progressive, only 0.75% of the coin-in is used to fund the progressive while another 0.25% is held in reserve. Because the amount held in reserve is smaller (although not zero), the reset amount for the next progressive reset amount is reduced to $1,200. In some embodiments, the variations in the amount of coin-in used to fund progressive jackpot and that used to vary the reset amount is selected automatically by the wagering game. In other embodiments, player customization of the progressive jackpot is possible by allowing the player to select the reset amount and/or the funding percentage, possibly upon payment of an appropriate fee.

While the present invention has been described with reference to one or more particular embodiments, those skilled in the art will recognize that many changes may be made thereto without departing from the scope of the invention. For example, some of the ways of winning a progressive jackpot discussed above may instead be used to gain eligibility for a progressive jackpot, and vice versa. Accordingly, each of the foregoing embodiments and obvious variations thereof is contemplated as falling within the scope of the claimed invention, as is stage forth in the following claims.

The invention claimed is:

1. A gaming system, comprising:

a first gaming machine including a first wager input device for receiving a first wager input from a first player for playing a first wagering game, and at least one first display operable to display a first outcome of said first wagering game and a first standard pay table therefor, said first outcome being randomly selected from a first plurality of outcomes, said first plurality of outcomes including at least one first progressive-eligibility outcome for a progressive jackpot, said progressive jackpot being associated with said first wagering game, said first progressive-eligibility outcome allowing said first player to be eligible for potentially winning said progressive jackpot; and a second gaming machine including a second wager input device for receiving a second wager input from a second player for playing a second wagering game; and at least one second display operable to display a second outcome of said second wagering game and a second standard pay table therefor, said second outcome being randomly selected from a second plurality of outcomes, said second plurality of outcomes including at least one second progressive-eligibility outcome for said progressive jackpot, said progressive jackpot also being associated with said second wagering game, said second progressive-eligibility outcome allowing said second player to be eligible for potentially winning said progressive jackpot; and wherein, in response to said first outcome at said first gaming machine being said at least one first progressive-eligibility outcome, and entirely independent of said playing of said second wagering game at said second gaming machine, said first standard pay table is converted to a first progressive pay table for said progressive jackpot at said first gaming machine but not at said second gaming machine, said first standard pay table and said first progressive pay table having at least one common winning symbol combination of one or more first winning symbol combinations; and wherein, in response to said second outcome at said second gaming machine being said at least one second progressive-eligibility outcome, and entirely independent of said playing of said first wagering game at said first gaming machine, said second standard pay table is converted to a second progressive pay table for said progressive jackpot at said second gaming machine but not at said first gaming machine, said second standard pay table and said second progressive pay table having at least one common winning symbol combination of one or more second winning symbol combinations.

2. The gaming system according to claim 1, wherein said first progressive-eligibility outcome triggers a predetermined first eligibility period and said first player is awarded a first award from said first progressive pay table for at least one wagering game outcome achieved during said first eligibility period; and wherein said second progressive-eligibility outcome triggers a predetermined second eligibility period and said second player is awarded a second award from said second progressive pay table for at least one wagering game outcome achieved during said second eligibility period.

3. The gaming system according to claim 1, wherein said first progressive pay table and said first standard pay table use one or more different ones of said first winning symbol combinations; and wherein said second progressive pay table and said second standard pay table use one or more different ones of said second winning symbol combinations.

4. The gaming system according to claim 1, wherein said first standard pay table and said first progressive pay table have a plurality of common winning symbol combinations of said first winning symbol combinations; and wherein said second standard pay table and said second progressive pay table have a plurality of common winning symbol combinations of said second winning symbol combinations.

5. The gaming system according to claim 1, wherein at least one of said first progressive pay table and said second progressive pay table includes several tiers of progressive jackpots, each tier being a multiple of an immediately preceding tier.

6. The gaming system according to claim 1, wherein at least one of said first progressive pay table and said second progressive pay table includes non-monetary awards.

7. The gaming system according to claim 6, wherein said non-monetary awards include one or more of the following: player's club points, credit multipliers, extra picks in a player-selection game, and additional spins in a free-spins game.

8. The gaming system according to claim 1, wherein said first progressive-eligibility outcome includes a designated first game symbol, said first player becoming eligible for said progressive jackpot upon appearance of said first game symbol in said first wagering game; and wherein said second progressive-eligibility outcome includes a designated second game symbol, said second player becoming eligible for said progressive jackpot upon appearance of said second game symbol in said second wagering game.

9. A gaming system comprising:

wager input devices for receiving wager inputs from players for playing wagering games at respective ones of a plurality of linked gaming machines;

displays operable to display outcomes of said wagering games and standard pay tables at respective ones of said gaming machines, said outcomes being randomly selected from a plurality of outcomes, said plurality of outcomes including at least one progressive-eligibility outcome for a progressive jackpot, said progressive jackpot being associated with said wagering games, said progressive-eligibility outcome allowing a respective one of said players to be eligible for potentially winning said progressive jackpot; and wherein, in response to said outcome at one of said gaming machines being said at least one progressive-eligibility outcome, and entirely independent of said playing of wagering games at other ones of said gaming machines, a corresponding one of said standard pay tables at said one of said gaming machines is converted to a progressive pay table for said progressive jackpot at said one of said gaming machines but not at other ones of said gaming machines, said one of said standard pay tables and said progressive pay table having at least one common winning symbol combination.

10. The gaming system according to claim 9, wherein said at least one progressive-eligibility outcome triggers a predetermined eligibility period and a respective one of said players is awarded an award from said progressive pay table for at least one wagering game outcome achieved during said eligibility period.

11. The gaming system according to claim 9, wherein said progressive pay table and said one of said standard pay tables use one or more different winning symbol combinations.

12. The gaming system according to claim 9, wherein said standard pay table and said progressive pay table have a plurality of common winning symbol combinations of said winning symbol combinations.

13. The gaming system according to claim 9, wherein said progressive pay table includes several tiers of progressive jackpots, each tier being a multiple of an immediately preceding tier.

14. The gaming system according to claim 9, wherein said progressive pay table includes non-monetary awards.

15. The gaming system according to claim 14, wherein said non-monetary awards include one or more of the following: player's club points, credit multipliers, extra picks in a player-selection game, and additional spins in a free-spins game.

16. The gaming system according to claim 9, wherein said at least one progressive-eligibility outcome includes a designated game symbol, a respective one of said players becoming eligible for said progressive jackpot upon appearance of said game symbol in respective one of said wagering games.

17. A method for conducting a wagering game on a plurality of linked gaming machines, the method comprising:

receiving, via a first wager input device of a first gaming machine, a first wager from a first player for playing a first wagering game;

displaying on a first display of said first gaming machine a first outcome of said first wagering game and a first standard pay table therefor;

randomly selecting said first outcome from a first plurality of outcomes, said first plurality of outcomes including at least one first progressive-eligibility outcome for a progressive jackpot, said progressive jackpot being associated with said first wagering game, said first progressive-eligibility outcome allowing said first player to be eligible for potentially winning said progressive jackpot;

receiving, via a second wager input device of a second gaming machine, a second wager from a second player for playing a second wagering game;

displaying on a second display of said second gaming machine a second outcome of said second wagering game and a second standard pay table therefor;

randomly selecting said second outcome from a second plurality of outcomes, said second plurality of outcomes including at least one second progressive-eligibility outcome for said progressive jackpot, said progressive jackpot being associated with said second wagering game, said second progressive-eligibility outcome allowing said second player to be eligible for potentially winning said progressive jackpot;

in response to said first outcome at said first gaming machine being said at least one first progressive-eligibility outcome, and entirely independent of said playing of said second wagering game at said second gaming machine, converting said first standard pay table into a first progressive pay table for said progressive jackpot at said first gaming machine but not at said second gaming machine, said first standard pay table and said first progressive pay table having at least one common winning symbol combination of one or more first winning symbol combinations; and in response to said second outcome at said second gaming machine being said at least one second progressive-eligibility outcome, and entirely independent of said playing of said first wagering game at said first gaming machine, converting said second standard pay table into a second progressive pay table for said progressive jackpot at said second gaming machine but not at said first gaming machine, said second standard pay table and said second progressive pay table having at least one common winning symbol combination of one or more second winning symbol combinations.

18. The method according to claim 17, further comprising triggering a predetermined first eligibility period in response to said first progressive-eligibility outcome;

awarding said first player a first award from said first progressive pay table for at least one wagering game outcome achieved during said first eligibility period;

triggering a predetermined second eligibility period in response to said second progressive-eligibility outcome; and awarding said second player a second award from said second progressive pay table for at least one wagering game outcome achieved during said second eligibility period.

19. The method according to claim 17, further comprising displaying one or more different ones of said first winning symbol combinations for said first progressive pay table and said first standard pay table; and displaying one or more different ones of said second winning symbol combinations for said second progressive pay table and said second standard pay table.

20. The method according to claim 17, displaying for said first standard pay table and said first progressive pay table a plurality of common winning symbol combinations of said first winning symbol combinations; and displaying for said second standard pay table and said second progressive pay table a plurality of common winning symbol combinations of said second winning symbol combinations.

21. The method according to claim 17, further comprising displaying several tiers of progressive jackpots for at least one of said first progressive pay table and said second progressive pay table, each tier being a multiple of an immediately preceding tier.

22. The method according to claim 17, further comprising displaying non-monetary awards for at least one of said first progressive pay table and said second progressive pay table.

23. The method according to claim 22, wherein said non-monetary awards include one or more of the following: player's club points, credit multipliers, extra picks in a player-selection game, and additional spins in a free-spins game.

24. The method according to claim 17, further comprising:

designating a first game symbol in said at least one first progressive-eligibility outcome;

upon appearance of said first game symbol, making said first player eligible for said progressive jackpot;

designating a second game symbol in said at least one second progressive-eligibility outcome; and upon appearance of said second game symbol, making said second player eligible for said progressive jackpot.

* * * * *